Dec. 15, 1925.  1,566,167
P. F. PETERSEN ET AL
AUTOMOBILE LICENSE HOLDER
Filed Dec. 8, 1924
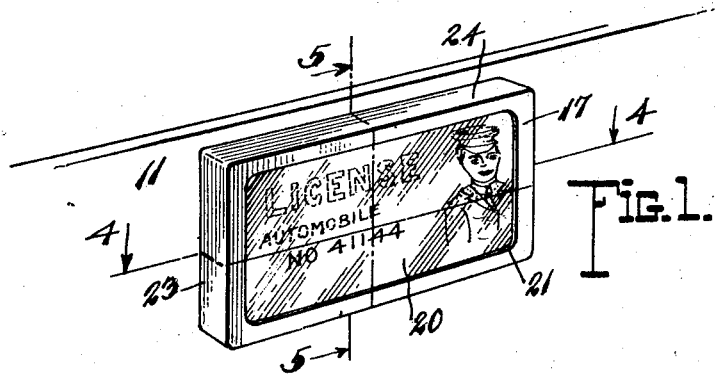
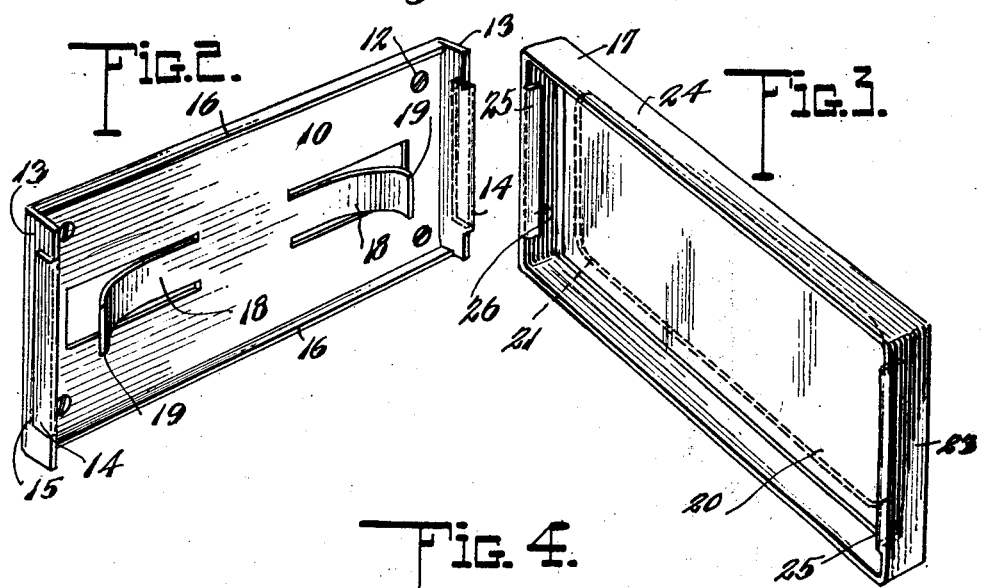
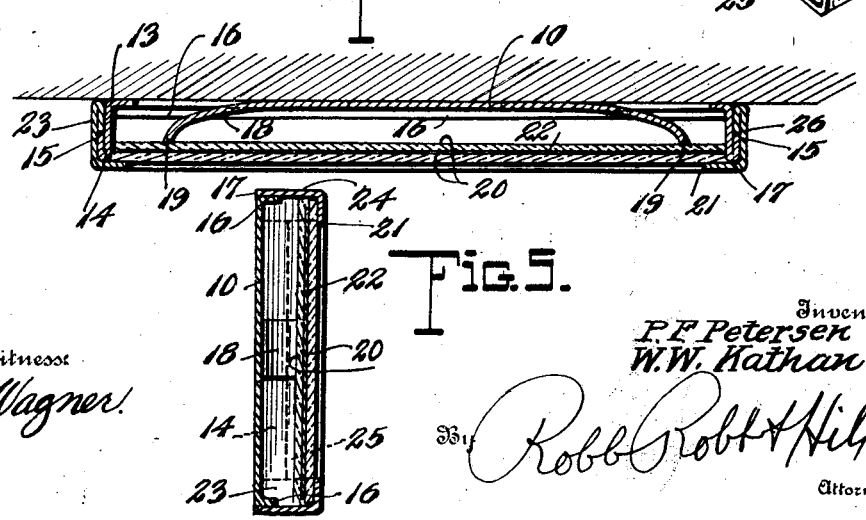
Inventor
P. F. Petersen
W. W. Nathan Patented Dec. 15, 1925.

1,566,167

UNITED STATES PATENT OFFICE.

PETER F. PETERSEN AND WILLIAM W. KATHAN, OF TULSA, OKLAHOMA, ASSIGNORS OF ONE-THIRD TO FRANCIS S. BROOKS, OF TULSA, OKLAHOMA.

AUTOMOBILE LICENSE HOLDER.

Application filed December 8, 1924. Serial No. 754,616.

*To all whom it may concern:*

Be it known that we, PETER F. PETERSEN and WILLIAM W. KATHAN, citizens of the United States, residing at Tulsa, in the county of Tulsa and State of Oklahoma, have invented certain new and useful Improvements in Automobile License Holders, of which the following is a specification.

This invention relates to an automobile license holder, and particularly to a construction in which a license or other identification means may be secured in a visible position against theft or removal.

In holders of this character it has been customary to provide key-operated locking mechanism which could be manipulated to release the enclosed license and involve a somewhat complicated and expensive construction to manufacture in which the glass protecting the license was liable to rattle in the movement of the vehicle.

This invention has removed these objections by a simplified construction in which the hood or cover for retaining the license is positively interlocked with the secured base and incapable of separation therefrom except upon destruction of the license and disconnection of the base from its supporting surface. It has also been found particularly desirable to provide a construction in which the two parts may be formed by a simple stamping operation and from single blanks so as to provide a rigidity of structure at the minimum of cost and embodying the most efficient locking action.

The invention has for an object to provide a novel and improved construction comprising a base provided with angularly disposed walls having interlocking means arranged to engage cooperating means upon the overlapping walls of the retaining hood or cover for the license.

A further object of the invention is to present a construction in which the base is provided with yielding end walls having a shoulder which cooperates with an interlocking shoulder carried by the overlapping end walls of the hood within which the license is confined by a transparent plate.

Another object of the invention is to provide a holder having a base plate with opposite angularly disposed walls formed with a reversely bent portion thereon to provide a shoulder and also with a spring member extended outwardly from the body of the plate to cooperate with a license retaining plate within a hood frame whose walls are overlapped and provided with shoulders thereon interlocking with those upon the base.

Other and further objects and advantages of the invention will be hereinafter set forth and the novel features thereof defined by the appended claims.

In the drawing:

Figure 1 is a perspective of the invention applied;

Figure 2 is a similar view of the base plate;

Figure 3 is a like view of the cooperating hood frame;

Figure 4 is an enlarged section on the line 4—4 of Figure 1; and

Figure 5 is a similar section on the line 5—5 of Figure 1.

Like characters of reference indicate like parts throughout the several figures of the drawing.

In the application of the invention the holder may be formed of any desired material or configuration but is herein disclosed as constructed from metal of a character adapted to be cut and stamped from a blank to readily form the complete structure by a simple mechanical operation. In this form the numeral 10 designates the base plate which is adapted to be secured upon a suitable support 11, such as the instrument board of a vehicle, by means of attaching devices 12 extending through the apertures in the plate. The opposite ends 13 of this plate are bent at an angle thereto and the extended portions 14 of these end walls are reversely bent into contact therewith so as to provide a shoulder 15. The longitudinal edges of the plate are also angularly bent as at 16 to form side flanges which when cooperating with the hood or cover 17 form a tight joint against the admission of water or dirt into the holder. The base plate has also cut from the body thereof spring members 18 which are bent inwardly so that their free ends 19 are adapted to engage transparent plates 20 carried by the cover 17.

These plates 20 are adapted to close the cut away front 21 of the cover and between them the license or other identification document 22 is adapted to be supported. It has been found desirable to connect these plates at their edges by an adhesive, or to attach this license to the rear plate 20 by an adhesive so that if the plates be broken in an attempt to remove the license the latter will be destroyed. This avoids the application of adhesive to the face of the license where the moisture would affect the ink thereon.

The cover 17 is formed with end walls 23 and side walls 24, the former being provided with extensions 25 which are bent inwardly or reversely into contact with the surface of the walls 23 so as to provide a shoulder 26 which cooperates with the shoulder 15 as shown in Figures 4, thus forming an interlocked joint and providing three thicknesses of material at the ends of the holder which effectually prevents tampering with the locked joint. This is also facilitated by the fact that the side and end walls of the cover are stamped or pressed from a single piece of material and are therefore continuous so that they cannot be separated to permit access to the interlocked connection.

In the application of the invention it will be seen that the base plate is first attached to the support and the hood or cover carrying the transparent plates and license is then pressed into contact therewith which causes an inward yielding of the end walls until the ends of the cover pass over the same and the cooperating shoulders interlock with each other. This is facilitated by the fact that the end walls of the base are free to yield while those of the cover being continuous effect an inward movement as the parts are applied. In this class of holder considerable annoyance is caused by the rattling of the glass protecting plates and the assemblage of the parts as just described brings the transparent plates with the license attached into contact with the spring members of the base slightly tensioning the same so that said plates are held in firm contact with the face of the cover. In case the license is not adhesively applied to the transparent plates these spring arms act to retain it in proper close contact therewith.

This construction absolutely prevents access to the license except by breaking the plates which destroys the license and it is then necessary to disconnect the base plate from its support in order to insert a tool between the end flange thereof and the cover and separate the interlocked shoulders when the parts are adapted to receive new plates and license. The structure therefore prevents the removal of a license and substitution of another, or the theft of such license while the structure is adapted to be formed by a stamping operation from single blanks of material thus rendering its production economical and providing a structure affording the greatest efficiency.

While the specific details of construction have been herein shown and described, the invention is not confined thereto as changes and alterations may be made without departing from the spirit thereof as defined by the following claims.

Having thus described our invention, what we claim as new and desire to secure by Letters Patent is:

1. A license holder comprising a base plate provided with angularly disposed walls formed with an inwardly faced locking shoulder, and a cover member having angular walls adapted to embrace the walls of said base plate and provided upon their inner face with cooperating outwardly faced locking shoulders disposed to interlock with the face of the shoulder on the walls of the base plate when the cover completely encloses said plate.

2. A license holder comprising a base plate provided with angularly disposed walls formed with an inwardly faced locking shoulder, a cover member having angular walls adapted to embrace the walls of said base plate and provided upon their inner face with cooperating outwardly faced locking shoulders disposed to interlock with the face of the shoulder on the walls of the base plate when the cover abuts the support for said plate, a transparent plate closing an aperture in said cover, and tension means carried by the base plate to contact with said transparent plate.

3. A license holder comprising a base plate having projected end flanges and inwardly faced shoulders upon their outer faces and intermediate abutting side flanges, a cover frame having an open front and side flanges enclosing those of the base plate and provided with outwardly faced interlocking shoulders carried by the inner faces of the covered flanges, a transparent plate carried within an open face of said cover member, and spring members bent outwardly from the base plate and disposed at their free ends to press said cover outward to retain the shoulders in contact.

4. A license holder comprising a base plate having opposite end flanges with a reversely bent portion to form a shoulder, a cover frame provided at its end walls with an inwardly bent portion to form a cooperating shoulder adapted to interlock with the base plate shoulder when the cover is in contact with the free edge of the base plate flange, and a transparent plate carried by said cover.

5. A license holder adapted to be formed of separate plates by a stamping operation and comprising a base plate having angularly bent side and end walls, the latter being provided with reversely bent extensions to form shoulders, and a cooperating cover plate having continuous side and end walls the latter being formed with inwardly bent extensions to provide cooperating shoulders to abut the ends of those of the base plate when the cover engages the bent extension of the base plate walls.

6. A license holder adapted to be formed of separate plates by a stamping operation and comprising a base plate having angularly bent side and end walls, the latter being provided with reversely bent extensions to form shoulders, and a cooperating cover plate having continuous side and end walls the latter being formed with inwardly bent extensions to provide cooperating shoulders to abut the ends of those of the base plate when the cover engages the bent extension of the base plate walls, said base plate being provided intermediate its ends with inwardly bent spring arms cut from the body thereof.

In testimony whereof we affix our signatures.

PETER F. PETERSEN.
WILLIAM W. KATHAN.